(12) United States Patent
Bhowmik et al.

(10) Patent No.: US 12,037,554 B2
(45) Date of Patent: Jul. 16, 2024

(54) HOMOGENOUS CATALYTIC COMPOSITION FOR IMPROVING LPG COMBUSTION

(71) Applicant: Hindustan Petroleum Corporation Limited, Bengaluru (IN)

(72) Inventors: Sandip Bhowmik, Bangalore (IN); Krishnamurthy Narayanan, Bangalore (IN); Soniya Naik, Bangalore (IN); Balasubramaniam Ravi, Bangalore (IN)

(73) Assignee: HINDUSTAN PETROLEUM CORPORATION LIMITED, Bengaluru (IN)

( * ) Notice: Subject to any disclaimer, the term of this patent is extended or adjusted under 35 U.S.C. 154(b) by 0 days.

(21) Appl. No.: 18/023,606

(22) PCT Filed: Aug. 16, 2022

(86) PCT No.: PCT/IN2022/050738
§ 371 (c)(1),
(2) Date: Feb. 27, 2023

(87) PCT Pub. No.: WO2023/126957
PCT Pub. Date: Jul. 6, 2023

(65) Prior Publication Data
US 2024/0110115 A1  Apr. 4, 2024

(30) Foreign Application Priority Data
Dec. 27, 2021  (IN) .............................. 202141061004

(51) Int. Cl.
| | | |
|---|---|---|
| C10L 1/22 | (2006.01) | |
| B01J 31/22 | (2006.01) | |
| C10L 1/228 | (2006.01) | |

(52) U.S. Cl.
CPC ............ *C10L 1/228* (2013.01); *B01J 31/223* (2013.01); *B01J 31/2243* (2013.01); *B01J 2531/38* (2013.01); *C10L 2230/04* (2013.01); *C10L 2270/08* (2013.01)

(58) Field of Classification Search
CPC .. C10L 1/228; C10L 2230/04; C10L 2270/08; B01J 31/223; B01J 31/2243; B01J 2531/38
See application file for complete search history.

(56) References Cited

U.S. PATENT DOCUMENTS

| | | |
|---|---|---|
| 3,591,355 A | 7/1971 | Kessler |
| 3,989,479 A | 11/1976 | White |
| 4,264,335 A | 4/1981 | Bello et al. |
| 4,424,165 A | 1/1984 | Thompson |
| 5,236,467 A | 8/1993 | Fritz |
| 5,449,387 A | 9/1995 | Hawkins et al. |
| 8,163,042 B2 | 4/2012 | Rao et al. |
| 8,741,798 B2 | 6/2014 | Cunningham |
| 2009/0298674 A1 | 12/2009 | Cunningham |
| 2020/0216762 A1* | 7/2020 | López Quintela ..... C10G 27/04 |
| 2022/0372386 A1* | 11/2022 | Bhowmik ............... C10L 3/003 |

FOREIGN PATENT DOCUMENTS

WO  WO-2020/208646 A1  10/2020

OTHER PUBLICATIONS

International Search Report and Written Opinion for PCT/IN2022/050738, dated Dec. 22, 2022, 10 pgs.
P. C. de Sousa Filho, et al., "Amphiphilic Cerium(III) β-diketonate as a Catalyst for Reducing Diesel/Biodiesel Soot Emissions", Applied Catalysis A: General; ScienceDirect; vol. 360, 2009, pp. 210-217.
Z. Su, et al., "Boosting the Catalytic Performance of $CeO_2$ in Toluene Combustion via the Ce—Ce Homogeneous Interface", Environmental Science & Technology, pubs.acs.org/est; American Chemical Society; 2021; 10 pgs.
N. L. Edleman, et al., "Synthesis and Characterization of Volatile, Fluorine-Free β-Ketoiminate Lanthanide MOCVD Precursors and Their Implementation in Low-Temperature Growth of Epitaxial $CeO_2$ Buffer Layers for Superconducting Electronics", Inorganic Chemistry; vol. 41, 2002; pp. 5005-5023.

* cited by examiner

*Primary Examiner* — Ellen M McAvoy
(74) *Attorney, Agent, or Firm* — BLANK ROME LLP

(57) ABSTRACT

The present invention discloses a homogenous cerium (Ce) catalyst composition comprising Ce(IV) complex alone, or Ce(IV) complex in a mixture with Ce(III) complex, that can significantly improve both LPG and soot combustion, resulting in higher flame temperatures, faster heating, reduced cooking time and reduced fuel consumption. The cerium(III) complex is cerium(III) 2-ethylhexanoate and the cerium(IV) complex is aqua(2-N-(2-hydroxyethylimino)-4-pentanoate) dinitrocerium(IV) $[Ce(L1)(H_2O)(NO_3)_2]$, wherein L1 is 2-N-(2-hydroxyethylimino)-4-pentanone.

10 Claims, No Drawings

HOMOGENOUS CATALYTIC COMPOSITION FOR IMPROVING LPG COMBUSTION

RELATED APPLICATIONS

The present application is a national phase of PCT/IN2022/050738, filed Aug. 16, 2022, which claims the benefit of Indian Patent Application No. 202141061004, filed Dec. 27, 2021. The entire disclosures of which are hereby incorporated by reference.

FIELD OF THE INVENTION

The invention relates to a homogenous cerium (Ce) catalyst composition comprising Ce(IV) complex alone, or Ce(IV) complex in a mixture with Ce(III) complex, that can significantly improve combustion of liquefied petroleum gas (LPG). The addition of the catalyst composition to LPG fuel significantly improves the flame temperature and heating rate, while reducing LPG consumption. The invention also relates to a process for preparation of a homogenous catalyst composition, and a process for preparation of a homogenous catalyst composition doped LPG fuel.

BACKGROUND OF THE INVENTION

Combustion of $C_3/C_4$ hydrocarbons, which are the principal constituents of cooking gas LPG, is a complex phenomenon and depends critically on several key parameters such as the composition, calorific values of individual components, soot formation, oxygen flow, etc. Therefore, to improve the combustion efficiency different possibilities are looked at. Also, the heat produced per unit mass of the fuel is directly dependent on the hydrocarbon composition, i.e., $C_3/C_4$ ratio, presence of $C_3/C_4$ olefins, etc. However, considering the composition of LPG to be optimal and dependent on various external factors, the only viable way is to use a catalyst to improve the LPG combustion kinetics.

Several such catalysts are reported in literature for combustion improvement of hydrocarbons. U.S. Pat. No. 5,236,467 by Excellene Ltd discloses use of methyl ethyl ketone and methyl terbutyl ether for use as torch gas. U.S. Pat. No. 3,591,355 by I G Corp. proposes the addition of liquid alkanol such as methanol and a mixture of alkanes such as pentane and isopentane, while U.S. Pat. No. 3,989,479 by Individual discloses the addition of methanol to improve combustion kinetics of LPG. U.S. Pat. No. 8,163,042 by Bharat Petroleum Corp. Ltd reports the addition of organometallic compound, aromatic amines to base gas that reduces the consumption of both fuel and oxygen.

Additionally, a combustion improver may be thought to improve the combustion kinetics of the LPG. However, it is to be noted that no such additive/combustion improver can modulate the theoretical calorific output of LPG in any way. In principle, use of any combustion boosters/improver would result in faster cooking because of faster kinetics. However, none can improve the overall heat output from LPG combustion as it would not be able to influence the thermodynamics of the process.

It is to be noted that to realize the full calorific value of a given LPG fuel, complete combustion should happen in presence of stoichiometric oxygen. Such combustion results in "oxidizing flames" which are rich in oxygen, blue in color and have less luminosity. However, under real cooking conditions, due to soot and other deposit formation in the burner pores and orifices, LPG fuel often gets lesser oxygen than the stoichiometric requirement. As a result, LPG burns with a lower flame temperature with higher luminosity. Therefore, combustion of soot is considered critical to achieve optimum flame and maximum calorific output which in turn would reduce LPG fuel consumption significantly.

Lanthanides, especially cerium (Ce) oxides and complexes have been used extensively as a combustion improving catalyst. There is an abundance of literature precedence where heterogeneous Ce-based catalyst are used to significantly improve propane combustion and reduce complete combustion temperature. However, very few corresponding reports exists for homogenous Ce complexes.

U.S. Pat. No. 8,741,798 by Individual discloses catalysts for hydrocarbon oxidation comprising cerium (III) 2-ethylhexanoate which provide improvements to the oxidation of hydrocarbons, more efficient oxidation, reduced temperatures, and improved fuel economy. Experimental oxidation of diesel fuel using these catalysts reduced overall fuel consumption by about 10% to 20%.

U.S. Pat. No. 4,264,335 by Chevron USA Inc., discloses suppression of octane requirement increase of gasoline by incorporation in the gasoline a minor amount of cerium (III) or cerium (IV) 2-ethylhexanoate. The fuel composition comprises comprising a major amount of gasoline and in solution between about 0.05 and about ten grams of the cerium (III) or cerium (IV) salt of 2-ethylhexanoic acid per gallon of gasoline.

U.S. Pat. No. 4,424,165 by Corning Glass Works discloses a β-diketonate complex of $Ce^{+3}$ M Ce(fod)$_4$, wherein M is selected from the group: Na, Li, K, Cs and Rb. Ce(fod)$_4$ offers significant advantages over prior art β-diketonate complexes of cerium with respect to both thermal stability and volatility. It is also stable against decomposition at sufficiently high temperatures. It is prepared by using methanol solution of cerium nitrate ($Ce(NO_3)_3 \cdot 6H_2O$), methanol solution of Hfod, NaOH and hexane. The product is a crystalline mixture of Na Ce(fod)$_4$ and Ce(fod)$_4$.

U.S. Pat. No. 5,449,387 by Rhodia Ltd discloses novel cerium (IV) oxidic compounds, having formula $(H_2O)_p$ $[CeO(A)_2 \cdot (AH)_n]_m$, well suited as catalysts, e.g., for the clean combustion of hydrocarbon fuels. It acts as a combustion-promoting agent. These cerium (IV) oxidic compounds may also be introduced into the filters or soot traps (reservoirs) of vehicular exhaust lines, these being designed to trap the carbon-containing particles produced by combustion of the various combustible materials or fuels.

Osvaldo A. Serra et al. discloses synthesis of cerium (III) β-diketonate Ce(hdacac)$_3$(Hhdacac)$_3 \cdot 2H_2O$, which acts as a catalyst for the reduction of soot emissions for diesel/biodiesel applications. Due to its amphiphilic character, this complex can be solubilized in non-polar fuels, thus generating cerium (IV) oxide particles, which efficiently catalyze the oxidation of diesel/biodiesel soot. Further, the complex can function as a soluble precursor of homogeneous $CeO_2$ spherical nanoparticles.

Ziang Su et al. relates to designing homogeneous interfaces which can become an emerging methodology to enhance the catalytic combustion performance of metal oxide catalysts. A mesocrystalline $CeO_2$ catalyst with abundant Ce—Ce homogeneous interfaces is synthesized via a self-flaming method which exhibits improved catalytic performance. The $CeO_2$ mesocrystal has superior redox property and oxygen storage capacity via forming various oxygen vacancies.

The inventors of the present invention aimed to develop a homogenous catalyst composition for cooking gas LPG that can reduce the cooking time and LPG fuel consumption significantly. The homogenous catalyst composition comprises Ce (IV) complex. To take advantage of the low redox potential barrier between the +3 and +4 oxidation states of cerium, which is expected to boost the catalytic efficiency, the homogenous cerium catalyst composition also comprises a mixture of Ce(IV) complex with the Ce(III) complex in an optimized ratio. Furthermore, ligand structures have been synthetically modified to increase catalytic efficiency. The resulting catalyst composition helps to simultaneously improve soot and LPG combustion, thereby ensuring faster combustion kinetics and higher oxygen availability for flame access for the LPG fuel. This in turn results in higher flame temperatures, faster heating, and reduced fuel consumption.

SUMMARY OF THE INVENTION

The present invention discloses a homogenous Cerium (Ce) catalyst composition comprising Ce(IV) complex alone, or Ce(IV) complex in a mixture with Ce(III) complex, that can improve combustion of the LPG. The catalyst composition also improves the soot combustion, resulting in higher flame temperatures, faster heating, and reduced fuel consumption. The Ce(III) complex is cerium(III) 2-ethylhexanoate and the Ce(IV) complex is aqua(2-N-(2-hydroxyethylimino)-4-pentanoate)dinitrocerium (IV) [Ce(L1)(H2O)(NO3)$_2$], wherein L1 is 2-N-(2-hydroxyethylimino)-4-pentanone.

Technical Advantages of the Invention

The present invention has the following advantages over the cited prior arts:
  (i) Both Ce(III) (cerium(III) 2-ethylhexanoate) and Ce(IV) (aqua(2-N-(2-hydroxyethylimino)-4-pentanoate) dinitrocerium (IV) [Ce(L1)(H$_2$O)(NO3)$_2$]) complexes individually increase the flame temperature; however, positive synergy is observed for the mixture of Ce(III) and Ce(IV) complexes. The Ce—C1 complex, aqua(2-N-(2-hydroxyethylimino)-4-pentanoate) dinitrocerium (IV) [Ce(L1)(H$_2$O)(NO$_3$)$_2$], in particular, shows markedly improved performance as compared to a similar β-diketonate, Ce—C2 complex, tetraacetylacetonatecerium (IV). This can be attributed to ligand L1, present in the Ce—C1 complex, specifically designed to improve nucleophilicity of acetylacetone. The increase in flame temperature is up to 10% due to addition of homogenous Ce catalyst composition to LPG fuel. Also, the highest flame temperature is achieved for an optimized weight ratio of 2:1 of Ce(III) and Ce(IV) complex. Flame temperature increases linearly with increasing concentration of catalyst composition and is optimum at about 12.5 ppm concentration of catalyst composition, beyond which the rate of increase decreases.
  (ii) The catalyst composition helps to improve soot combustion, thereby increasing the oxygen access for the LPG fuel and thus reducing the LPG fuel consumption.
  (iii) The catalyst composition provides faster heating and thereby reduces the cooking time.
  (iv) Linear decrease is observed for heating time and fuel consumption with increased concentration of the catalyst composition.

Objectives of the Invention

It is a primary objective of the present invention to provide a homogenous catalyst composition comprising Ce(IV) complex alone, or cerium(IV) complex in a mixture with cerium(III) complex, wherein the cerium(III) complex is cerium(III) 2-ethylhexanoate and the cerium(IV) complex is aqua(2-N-(2-hydroxyethylimino)-4-pentanoate)dinitrocerium (IV) [Ce(L1)(H2O)(NO3)2], wherein L1 is 2-N-(2-hydroxyethylimino)-4-pentanone.

It is another objective of the present invention to provide a homogenous catalyst composition for improving LPG combustion.

It is another objective of the present invention to provide a process for preparation of the homogenous catalyst composition comprising synthesis of 2-N-(2-hydroxyethylimino)-4-pentanone (L1), synthesis of aqua(2-N-(2-hydroxyethylimino)-4-pentanoate)dinitrocerium (IV) [Ce(L1)(H2O)(NO3)2]: Ce—C1, synthesis of tetraacetylacetonatecerium (IV) [Ce(acac)4]: Ce—C2, synthesis of cerium(III) 2-ethylhexanoate: Ce—C3, and preparation of a mixture of cerium(III) and cerium(IV) complex comprising cerium(III) 2-ethylhexanoate (Ce—C3) and aqua(2-N-(2-hydroxyethylimino)-4-pentanoate)dinitrocerium (IV) [Ce(L1)(H$_2$O)(NO$_3$)$_2$] (Ce—C1).

Yet another objective of the present invention is to provide a process for preparation of homogenous composition of cerium catalyst doped LPG.

Abbreviations

Ce: Cerium
Cerium(III): Ce(III)
Cerium(IV): Ce(IV)
LPG: liquefied petroleum gas
[Ce(acac)$_4$]: tetraacetylacetonate cerium(IV)
L1: 2-N-(2-Hydroxyethylimino)-4-pentanone
Ce—C1: aqua(2-N-(2-hydroxyethylimino)-4-pentanoate) dinitrocerium (IV) [Ce(L1)(H$_2$O)(NO$_3$)$_2$]
Ce—C2: tetraacetylacetonate cerium (IV) [Ce(acac)$_4$]
Ce—C3: cerium(III) 2-ethylhexanoate
IR: infrared spectroscopy
NMR: nuclear magnetic spectroscopy
XPS: x-ray photoelectron spectroscopy
FLIR: forward-looking infrared
DMF: dimethylformamide DETAILED DESCRIPTION OF THE INVENTION:

Those skilled in the art will be aware that the present disclosure is subject to variations and modifications other than those specifically described. It is to be understood that the present disclosure includes all such variations and modifications. The disclosure also includes all such steps of the process, features of the system, referred to or indicated in this specification, individually or collectively and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have their meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally equivalent products and processes are clearly within the scope of the disclosure, as described herein.

The present invention relates to homogenous Ce catalyst composition for improving liquefied petroleum gas (LPG) combustion. The composition comprises Ce(IV) complex alone, or Ce(IV) complex in a mixture with Ce(III) complex, wherein the Ce(III) complex is cerium(III) 2-ethylhexanoate and the Ce(IV) complex is aqua(2-N-(2-hydroxyethylimino)-4-pentanoate)dinitrocerium (IV) [Ce(L1)(H$_2$O)(NO$_3$)$_2$], wherein L1 is 2-N-(2-hydroxyethylimino)-4-pentanone.

In yet another embodiment, the catalyst composition is present in a concentration range of 2.5-20 ppm of the total LPG fuel composition.

In another embodiment of the invention, the Ce(III) complex is present in an amount ranging from 33-100 wt. % and the Ce(IV) complex is present in an amount ranging from 25-100 wt. % of the total catalyst composition.

In another embodiment of the invention, cerium(III) and cerium(IV) complexes in the mixture are present in a weight ratio ranging from 1:1 to 3:1, wherein the optimum weight ratio is 2:1.

In another embodiment, the homogenous cerium catalyst mixture comprises a concentration of 1.5-15 ppm of Ce(III) complex, i.e., cerium(III) 2-ethylhexanoate and a concentration of 0.8-10 ppm of Ce(IV) complex, i.e., aqua(2-N-(2-hydroxyethylimino)-4-pentanoate)dinitrocerium (IV) [Ce(L1)(H$_2$O)(NO$_3$)$_2$].

In another embodiment of the invention, both Ce(III) (cerium(III) 2-ethylhexanoate) and Ce(IV) (aqua(2-N-(2-hydroxyethylimino)-4-pentanoate)dinitrocerium (IV) [Ce(L1)(H2O)(NO3)2]) complexes individually increase the flame temperature; however, positive synergy is observed for the mixture of Ce(III) and Ce(IV) complexes. The increase in flame temperature is up to 10% due to addition of homogenous Ce catalyst mixture to LPG fuel. Also, the highest flame temperature is achieved for an optimized weight ratio of 2:1 of Ce(III) and Ce(IV) complex. Flame temperature increases linearly with increasing concentration of catalyst mixture and is optimum at about 12.5 ppm concentration of catalyst mixture, beyond which the rate of increase decreases.

In another embodiment, the process for preparation of the homogenous Ce catalyst composition comprises:

(a) synthesis of 2-N-(2-hydroxyethylimino)-4-pentanone (L1) by reacting acetyl acetone and ethanol amine in methanol solution and stirring for 24 hours;

Scheme 1 - Synthesis of L1

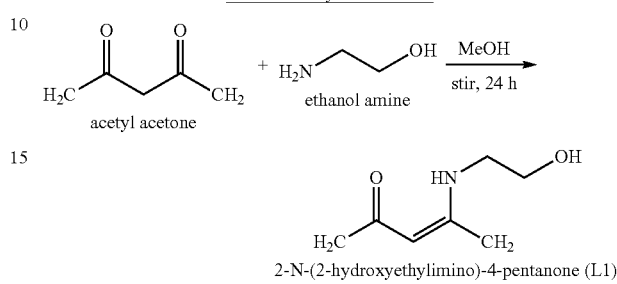

(b) synthesis of aqua(2-N-(2-hydroxyethylimino)-4-pentanoate)dinitrocerium (IV) [Ce(L1)(H$_2$O)(NO$_3$)$_2$] by reacting 2-N-(2-hydroxyethylimino)-4-pentanone (L1) and Ce(NO$_3$)$_3$·6H$_2$O in dimethylformamide solvent at 150° C. and keeping for 15 hours. The compound aqua(2-N-(2-hydroxyethylimino)-4-pentanoate)dinitrocerium (IV) [Ce(L1)(H$_2$O)(NO$_3$)$_2$] is known as Ce—C1;

Scheme 2 - Synthesis of Ce-C1

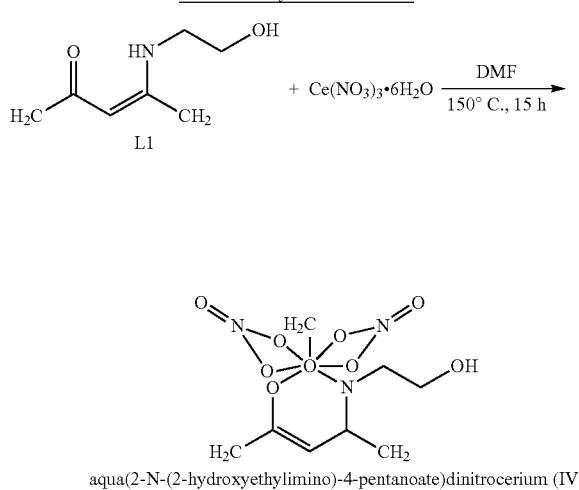

(c) synthesis of tetraacetylacetonate cerium (IV) [Ce(acac)$_4$] by reacting acetyl acetone, triethyl amine and Ce(NO$_3$)$_3$·6H$_2$O in methanol solution at 45° C. for 15 hours. The compound tetraacetylacetonate cerium (IV) [Ce(acac)$_4$] is known as Ce—C2;

Scheme 3 - Synthesis of Ce-C2

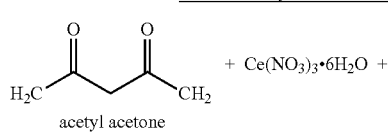

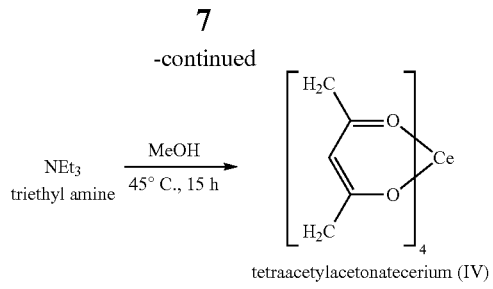

tetraacetylacetonatecerium (IV)

(d) synthesis of cerium(III) 2-ethylhexanoate by reacting sodium 2-ethylhexanoate and cerium nitrate hexahydrate and stirring for 5 hours. The compound cerium (III) 2-ethylhexanoate is known as Ce—C3; and (e) preparation of a mixture of cerium(III) and cerium(IV) complex comprising cerium(III) 2-ethylhexanoate (Ce—C3) and aqua(2-N-(2-hydroxyethylimino)-4-pentanoate)dinitrocerium (IV) [Ce(L1)(H$_2$O)(NO$_3$)$_2$] (Ce—C1).

In another embodiment, the Ce—C1 complex, aqua(2-N-(2-hydroxyethylimino)-4-pentanoate)dinitrocerium (IV) [Ce(L1)(H$_2$O)(NO$_3$)$_2$], shows markedly improved performance as compared to Ce—C2 complex, tetraacetylacetonatecerium (IV). This can be attributed to ligand L1, which is modified from acetyl acetone to increase electron availability on the complexed metal center (Ce(IV) complex) and reduce the formal charge on it. This in turn, significantly improves the catalytic efficiency of the redox pair (Ce(III) and Ce(IV) complexes).

In another embodiment, process for preparation of a homogenous catalyst composition doped LPG comprises:

(a) mixing cerium(III) 2-ethylhexanoate (Ce—C3) along with aqua(2-N-(2-hydroxyethylimino)-4-pentanoate) dinitrocerium (IV) [Ce(L1)(H$_2$O)(NO$_3$)$_2$] (Ce—C1) in hexane to form a solution; and (b) adding the solution of step (a) to LPG fuel in a compressed cylinder.

In another embodiment, the aforementioned catalyst composition reduces soot formation during LPG combustion.

In another embodiment, the aforementioned catalyst composition increases heating rate and thereby reduces the cooking time and the LPG fuel consumption.

EXAMPLES

Having described the basic aspects of the present invention, the following non-limiting examples illustrate specific embodiments thereof. Those skilled in the art will appreciate that many modifications may be made in the invention without changing the essence of the invention.

Example 1: Synthesis of Ce(III) and Ce(IV) Complexes (A) Synthesis of 2-N-(2-Hydroxyethylimino)-4-pentanone (L1)

A methanol solution of 2-aminoethanol (36.6 g, 0.6 mol) was added dropwise to a stirred solution of pentane-2,4-dione (60.1 g, 0.6 mol) in methanol keeping the total volume to be 600 mL. Sodium sulfate was added to remove the water generated during the condensation reaction and the mixture was stirred for 12 hours. The resulting yellow solution was diluted by addition of dichloromethane and filtered, and the solvent was removed under reduce pressure to afford 98% yield (84.3 g).

Scheme 1 - Synthesis of L1

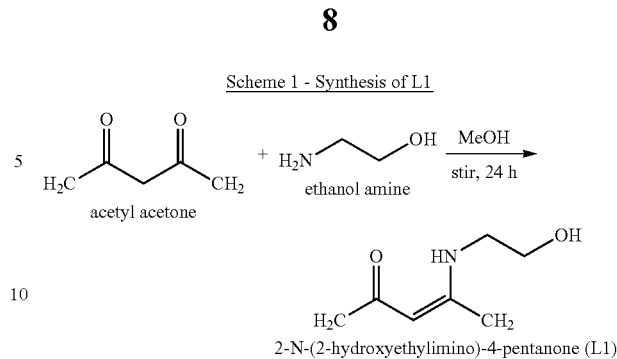

2-N-(2-hydroxyethylimino)-4-pentanone (L1)

(B) Synthesis of aqua(2-N-(2-hydroxyethylimino)-4-pentanoate)dinitrocerium (IV) [Ce(L1)(H$_2$O)(NO$_3$)$_2$]: Ce—C1

In an oven-dried single-neck round-bottom flask, L1 (143.21 mg, 1.2 mmol) was taken in a 5 mL of dimethylformamide (DMF) solvent. The temperature was kept at 100° C. and 0.5 mL aqueous solution of Ce(NO$_3$)$_3$·6H$_2$O (130.3 mg, 0.3 mmol) was added dropwise. Upon completion of addition, the temperature was raised to 150° C. and kept for 15 hours. Afterwards, methanol was added to obtain a dark brown precipitate and washed thoroughly with methanol, ethanol, and ether several times until clear filtrate.

The Ce—C1 complex was characterized using IR and NMR analysis. The characterization data includes IR (neat, cm$^{-1}$) 1516, 1349, 1062, 827; $^1$H NMR (500 MHz, DMSO-d$_6$): δ 8.31 (s, 1H), 1.90 (s, 1H), 1.23 (s, 2H), 0.85 (s, 1H), −0.09 (m, 6H).

Scheme 2 - Synthesis of Ce-C1

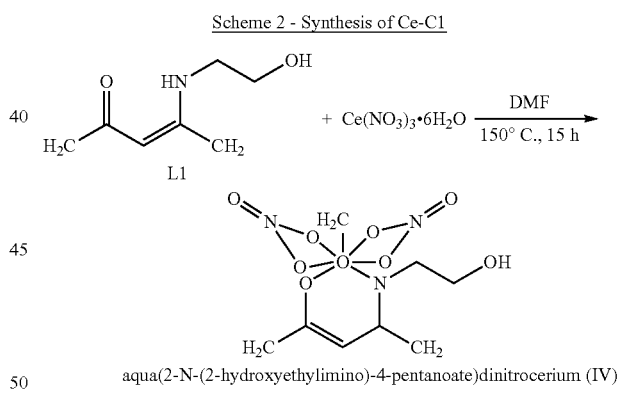

aqua(2-N-(2-hydroxyethylimino)-4-pentanoate)dinitrocerium (IV)

(C) Synthesis of tetraacetylacetonatecerium (IV) [Ce(acac)$_4$]: Ce—C2

In an oven-dried single-neck round-bottom flask, acetyl acetone (300.39 mg, 3 mmol) and triethyl amine (303.57 mg, 3 mmol) were dissolved in 25 mL methanol. Ce(NO$_3$)$_3$·6H$_2$O (217.22 mg, 0.5 mmol) was separately dissolved in 10 mL methanol. The metal solution was dropwise added to the ligand solution under magnetic stirring at room temperature. Then the resulting solution was heated for 15 hours at 45° C. Afterwards the solution was evaporated and washed with methanol, ethanol, and diethyl ether several times until clear filtrate. Finally, the resulting powdered complex was dried under vacuum system.

Scheme 3 - Synthesis of Ce-C2

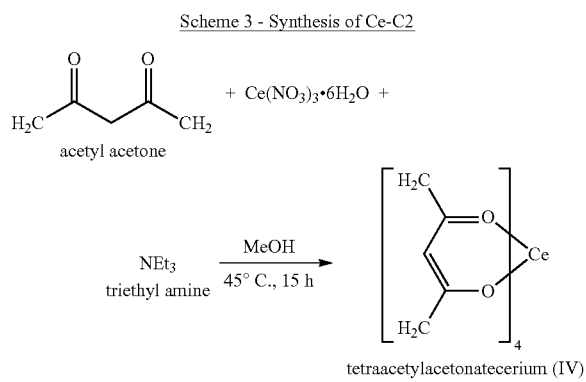

(D) Synthesis of cerium(III) 2-ethylhexanoate: (Ce—C3)

In an oven-dried single-neck round-bottom flask, sodium hydroxide (240.6 g, 6.015 mol) was dissolved in 1.5 L Millipore water and stirred for about 30 minutes before cooling to room temperature. To this solution, 2-Ethylhexanoic acid (867.7 g, 6.016 mol) was added and stirred for about 2 hours to form a uniform monolayer solution of sodium 2-Ethylhexanoate. To this prepared solution of sodium 2-Ethylhexanoate, cerium nitrate hexahydrate (653 g, 1.503 mol) was added and stirred well for 5 h. The solid obtained was dissolved in 2 L of n-hexane and water has been separated by using the separating funnel, dried over $Na_2SO_4$, evaporation of n-hexane on rotary evaporator at 60° C. for 1 h resulted in cerium(III) 2-Ethylhexanoate.

The Ce—C3 complex was characterized using IR and NMR analysis. The characterization data includes IR (neat, $cm^{-1}$) 2959, 2873, 2861, 1696, 1536, 1459, 1381, 1319, 1295, 1269, 1227. $^1$H NMR (500 MHz, $CDCl_3$): δ 0.70-0.92 (m, 10H), 0.94-1.24 (m, 2H), 1.30-1.53 (m, 2H), 2.43 (s, 1H).

Example 2: Preparation of Mixture of Ce(III) and Ce(IV) Complex

A mixture is prepared comprising cerium(III) and cerium (IV) complex, i.e., cerium(III) 2-ethylhexanoate (Ce—C3) and aqua(2-N-(2-hydroxyethylimino)-4-pentanoate)dinitrocerium (IV) [Ce(L1)($H_2O$)($NO_3$)$_2$] (Ce—C1).

Example 3: Preparation of Homogenous Cerium Catalyst Doped LPG 1.266 g of cerium(III) 2-ethylhexanoate (Ce—C3) along with 0.633 g of aqua(2-N-(2-hydroxyethylimino)-4-pentanoate)dinitrocerium (IV) [Ce(L1)($H_2O$)($NO_3$)$_2$] (Ce—C1) is dissolved in 100 ml of hexane to form a solution. Therefore, the weight ratio of Ce(III) to Ce(IV) is 2:1. 10 ml of this solution is then added to 19 kg of LPG in a compressed cylinder. This refers to the composition of Cat-III and is further used in Example 4 for the combustion and optimization studies.

Example 4: Combustion Studies and Optimization of Catalyst Composition

It is known that catalytic combustion by heterogeneous catalysts is often facilitated by lattice defects in the form of variable oxidation states of the same metal or by a different metal dopant in the lattice. Cerium (Ce) is often preferred as an active metal in combustion catalysts because of its multiple stable oxidation states with relatively low potential barrier between them. In a study of the present invention, the inventors have optimized organo-cerium complexes of different oxidation states and evaluated their efficiency for LPG combustion.

(A) Increase in Flame Temperature for Catalyst Composition

For purpose of the experiment, metal additives with 10 ppm (weight/weight) concentration were added to the LPG fuel and combusted in conventional brass burners under ambient air flow. LPG flow rate was kept constant at 10 g/min through a mass flow controller. The flame temperature was measured through forward-looking infrared (FR) camera. For the study, the camera was set at a fixed distance of one meter from the flame at an elevation angle of 300. The complete flame temperature profile was captured through a high resolution camera in 1 FPS. For each test, 1000 frames were recorded. An average flame temperature, at a fixed coordinate, was calculated over a continuous 100 frames (frame no 501-600) for a quantitative comparison. The results obtained are discussed in Table 1.

TABLE 1

FLIR temperature measurements with varying catalyst composition

| Sr. No. | Catalyst Composition | Total concentration of catalyst (in ppm (W/W)) of the total LPG composition | Tris-2-ethylhexanoate iron (III) complex | Ce—C3 | Ce—C2 | Ce—C1 | Average flame temperature over 100 frames at the burner tip (° C.) |
|---|---|---|---|---|---|---|---|
| 1. | Blank | 10 | 0 | 0 | 0 | 0 | 1539 |
| 2. | Cat-Fe | 10 | 1 | 0 | 0 | 0 | 1555 |
| 3. | Ce—C3 | 10 | 0 | 1 | 0 | 0 | 1641 |
| 4. | Ce—C2 | 10 | 0 | 0 | 1 | 0 | 1561 |
| 5. | Ce—C1 | 10 | 0 | 0 | 0 | 1 | 1594 |
| 6. | Cat-I | 10 | 0 | 1 | 0 | 2 | 1621 |
| 7. | Cat-II | 10 | 0 | 1 | 0 | 1 | 1657 |
| 8. | Cat-III | 10 | 0 | 2 | 0 | 1 | 1680 |
| 9. | Cat-IV | 10 | 0 | 3 | 0 | 1 | 1607 |

As can be seen from the results of Table 1, up to 10% rise in flame temperature was noticed when homogenous cerium catalysts were added to the LPG which is significantly higher as compared to comparable Iron complex, Tris-2-ethylhexanoate iron (III) complex. Optimized weight ratio of 2:1 of Ce—C3 (Ce(III) complex) and Ce—C1(Ce(IV) complex) increased the flame temperature to maximum. The synergistic effect between mixed oxidation state complexes is evident as the increase in flame temperature in the mixed catalytic system is significantly higher than when dosed individually.

Table 2 discloses the FLIR temperature measurements with varying catalyst composition in terms of weight percentage.

TABLE 2

FLIR temperature measurements with varying catalyst composition (wt. %)

| Sr. No. | Catalyst Composition | Total concentration of catalyst (in ppm (W/W)) of the total LPG composition | Relative wt. % of metal complexes in LPG | | | | Average flame temperature over 100 frames at the burner tip (° C.) |
|---|---|---|---|---|---|---|---|
| | | | Tris-2-ethylhexanoate iron (III) complex | Ce—C3 | Ce—C2 | Ce—C1 | |
| 1. | Blank | 10 | 0 | 0 | 0 | 0 | 1539 |
| 2. | Cat-Fe | 10 | 100 | 0 | 0 | 0 | 1555 |
| 3. | Ce—C3 | 10 | 0 | 100 | 0 | 0 | 1641 |
| 4. | Ce—C2 | 10 | 0 | 0 | 100 | 0 | 1561 |
| 5. | Ce—C1 | 10 | 0 | 0 | 0 | 100 | 1594 |
| 6. | Cat-I | 10 | 0 | 33.33 | 0 | 66.66 | 1621 |
| 7. | Cat-II | 10 | 0 | 50 | 0 | 50 | 1657 |
| 8. | Cat-III | 10 | 0 | 66.66 | 0 | 33.33 | 1680 |
| 9. | Cat-IV | 10 | 0 | 75 | 0 | 25 | 1607 |

As seen from Table 2, the Ce(III) complex is present in an amount ranging from 33-100 wt. % and the Ce(IV) complex is present in an amount ranging from 25-100 wt. % of the total catalyst composition.

(B) Increase in Flame Temperature for Catalyst Concentration

Further studies were carried out with the same catalyst composition (Cat-III), i.e., 2:1 ratio of Ce—C3 (Ce(III) complex) and Ce—C1(Ce(IV) complex). The effect of catalyst concentration is evaluated with FLIR camera under the same experimental conditions and is disclosed in Table 3.

TABLE 3

FLIR measurements at different dosage of Cat (III)

| Sr. No | Concentration of the catalyst mixture (in ppm) of the total LPG composition | Concentration of Ce(III) (in ppm) of the total LPG composition | Concentration of Ce(IV) (in ppm) of the total LPG composition | Average flame temperature over 100 frames at the burner tip (° C.) |
|---|---|---|---|---|
| 1. | 0 | 0 | 0 | 1539 |
| 2. | 2.5 | 1.66 | 0.83 | 1579 |
| 3. | 5 | 3.33 | 1.66 | 1614 |
| 4. | 7.5 | 5.0 | 2.5 | 1649 |
| 5. | 10 | 6.66 | 3.33 | 1680 |
| 6. | 12.5 | 8.33 | 4.16 | 1697 |
| 7. | 15 | 10 | 5 | 1707 |
| 8. | 20 | 13.33 | 6.66 | 1712 |

It is observed from Table 3 that the flame temperature increases with increasing concentration of the catalyst. Flame temperature increases linearly with increasing concentration of catalyst mixture and is optimum at about 12.5 ppm concentration of catalyst mixture, beyond which the rate of increase decreases. The maximum increase in flame temperature is up to 10% due to addition of homogenous Ce catalyst mixture to LPG fuel. Additionally, the concentration of Ce(III) complex varies from 1.5-15 ppm and the concentration of Ce(IV) complex varies from 0.8-10 ppm of the total LPG composition.

(C) Effect on Cooking Time and LPG Consumption

To check the effect on cooking time and LPG consumption, the following experiment was performed. 1 kg of Millipore water (resistivity@ 25° C.: 18 MΩ-cm) was heated in a 1.5 Liter closed, insulated, adiabatic chamber from 25° C. to 100° C. by combusting varied concentration of catalyst doped LPG (2:1 ratio). The results are disclosed in Table 4.

TABLE 4

FLIR measurements at varying dosage of Cat (III)

| Sr. No | Concentration of the catalyst mixture (in ppm) of the total LPG composition | Concentration of Ce(III) (in ppm) of the total LPG composition | Concentration of Ce(IV) (in ppm) of the total LPG composition | Time taken to reach 100° C. (Sec) | LPG consumed (g) |
|---|---|---|---|---|---|
| 1. | 0 | 0 | 0 | 347 | 58 |
| 2. | 2.5 | 1.66 | 0.83 | 339 | 56.5 |
| 3. | 5 | 3.33 | 1.66 | 334 | 55.5 |
| 4. | 7.5 | 5.0 | 2.5 | 327 | 54.5 |
| 5. | 10 | 6.66 | 3.33 | 325 | 54 |
| 6. | 12.5 | 8.33 | 4.16 | 324 | 54 |
| 7. | 15 | 10 | 5 | 321 | 53.5 |
| 8. | 20 | 13.33 | 6.66 | 319 | 53.2 |

As can be seen from the results of Table 4, both heating time and fuel consumed decreased steadily with increased dosage. As mentioned earlier, the lower LPG fuel consumption can be correlated better to the soot combustion efficiency of the LPG rather than the flame temperature or faster kinetics alone.

(E) Effect on Soot Combustion

Direct evidence for more efficient soot combustion was obtained through x-ray photoelectron spectroscopy (XPS) spectroscopy. Soot was collected from the individual burner orifices before and after 120 mins of LPG combustion. C1s peak was monitored to analyze various oxidation states of carbon found in the soot. HR spectra was recorded for C1s peak with Al Kα source at 1486.4 eV with 0.5 eV step size in binding energy mode. The obtained spectra were deconvoluted and analyzed and results are listed in the Table 5.

TABLE 5

XPS intensity for C1S peak

| | | Intensity (cps) | | | | | | |
|---|---|---|---|---|---|---|---|---|
| | | Blank LPG (without catalyst) | | | | LPG with 10 ppm of Cat-III | | |
| Peak position (in eV) | Assigned C-bonding/ oxidation state | t = 0 | % of total Carbon | t = 120 mins | % of total Carbon | t = 0 | % of total Carbon | t = 120 mins | % of total Carbon |
| 284.4 | sp$^2$ C (C=C) | 1458 | 64 | 1911 | 61.8 | 1832 | 60.6 | 1743 | 61.2 |
| 285.2 | sp$^3$ C (C—C) | 754 | 33 | 1091 | 35.4 | 1103 | 36.5 | 821 | 28.8 |
| 286.7 | C—OH | 67 | 3 | 64 | 2.0 | 81 | 2.7 | 201 | 7 |
| 288.4 | C=O | 4 | 0 | 17 | 0.8 | 8 | 0.2 | 87 | 3 |

Normalized percentages of individual carbon types were considered for analysis. As can be seen from Table 5, the deconvoluted peaks arising at 286.7 and 288.4 were assigned to oxygenated carbon species. Therefore, increased percentage of these peaks would invariably indicate greater degree of combustion. Blank LPG showed no appreciable change in the total 5 percentage of the oxygenated species. It rather showed a small decrease from 3.0% for 0 mins to 2.8% upon 120 mins of combustion (addition of 286.7 and 288.4 eV peaks). LPG fuel doped with 10 ppm of Cat-III, on the other hand, showed a remarkable increase from 2.9% for 0 mins to 10% upon 120 mins of combustion of the total oxygenated species (addition of 286.7 and 288.4 eV peaks). The results clearly demonstrate more efficient soot combustion in case of additive doped LPG which in turn also improves LPG combustion efficiency.

The invention claimed is:

1. A homogenous catalyst composition for improving liquefied petroleum gas (LPG) combustion, the composition comprising:
    a cerium(IV) complex alone; or
    a cerium(IV) complex in a mixture with a cerium(III) complex,
    wherein the cerium(III) complex is cerium(III) 2-ethylhexanoate; and
    wherein the cerium(IV) complex is aqua(2-N-(2-hydroxyethylimino)-4-pentanoate)dinitrocerium(IV) [Ce(L1)(H$_2$O)(NO$_3$)$_2$],
    wherein L1 is 2-N-(hydroxyethylimino)-4-pentanone.

2. The homogenous catalyst composition as claimed in claim 1, wherein the Ce(III) complex is present in an amount ranging from 33-100 wt. % and the Ce(IV) complex is present in an amount ranging from 25-100 wt. % of the total catalyst composition.

3. The homogenous catalyst composition as claimed in claim 1, wherein the cerium(III) complex is present in a concentration range of 1.5-15 ppm of the total liquefied petroleum gas (LPG) composition.

4. The homogenous catalyst composition as claimed in claim 1, wherein the cerium(IV) complex is present in a concentration range of 0.8-10 ppm of the total liquefied petroleum gas (LPG) composition.

5. The homogenous catalyst composition as claimed in claim 1, wherein the cerium(III) and cerium(IV) complex are present in a weight ratio ranging from 1:1 to 3:1.

6. The homogenous catalyst composition as claimed in claim 5, wherein the cerium(III) and cerium(IV) complex are present in an optimum weight ratio of 2:1.

7. The homogenous catalyst composition as claimed in claim 1, wherein the catalyst composition increases flame temperature of the liquefied petroleum gas (LPG) up to 10%.

8. The homogenous catalyst composition as claimed in claims 1, wherein the catalyst composition is present in a concentration range of 2.5-20 ppm of the total liquefied petroleum gas (LPG) fuel composition.

9. A process for preparation of a homogenous catalyst composition for improving liquefied petroleum gas (LPG) combustion, the process comprising:
    (a) synthesis of 2-N-(2-hydroxyethylimino)-4-pentanone (L1) by reacting acetyl acetone and ethanol amine in methanol solution and stirring for 24 hours;
    (b) synthesis of aqua(2-N-(2-hydroxyethylimino)-4-pentanoate)dinitrocerium (IV) [Ce(L1)(H$_2$O)(NO$_3$)$_2$] by reacting L1 and Ce(NO$_3$)$_3$·6H$_2$O in dimethylformamide solvent at 150° C. and keeping for 15 hours;
    (c) synthesis of tetraacetylacetonate cerium (IV) [Ce(acac)$_4$] by reacting acetyl acetone, triethyl amine and Ce(NO$_3$)$_3$·6H$_2$O in methanol solution at 45° C. for 15 hours;
    (d) synthesis of cerium(III) 2-ethylhexanoate by reacting sodium 2-ethylhexanoate and cerium nitrate hexahydrate and stirring for 5 hours; and
    (e) preparation of a mixture of cerium(III) and cerium(IV) complex comprising cerium(III) 2-ethylhexanoate and aqua(2-N-(2-hydroxyethylimino)-4-pentanoate)dinitrocerium(IV) [Ce(L1)(H$_2$O)(NO$_3$)$_2$].

10. A process for preparation of a homogenous catalyst composition doped liquefied petroleum gas (LPG), the process comprising:
    (a) mixing cerium(III) 2-ethylhexanoate along with aqua(2-N-(2-hydroxyethylimino)-4-pentanoate)dinitrocerium(IV) [Ce(L1)(H$_2$O)(NO$_3$)$_2$] in hexane to form a solution,
    wherein L1 is 2-N-(2-hydroxyethylimino)-4-pentanoate; and
    (b) adding the solution of step (a) to liquefied petroleum gas (LPG) in a compressed gas cylinder.

* * * * *